United States Patent [19]

Kido

[11] Patent Number: 5,003,421
[45] Date of Patent: Mar. 26, 1991

[54] AUTOMATIC REVERSE TAPE RECORDER WITH HEAD TURN-OVER

[75] Inventor: Kunio Kido, Wako, Japan

[73] Assignee: Tanashin Denki Co., Ltd., Tokyo, Japan

[21] Appl. No.: 459,335

[22] Filed: Dec. 29, 1989

Related U.S. Application Data

[63] Continuation of Ser. No. 20,906, Mar. 2, 1987, abandoned.

[30] Foreign Application Priority Data

May 31, 1986 [JP] Japan ................................. 61-126650

[51] Int. Cl.$^5$ ......................... G11B 5/55; G11B 21/08
[52] U.S. Cl. .................................................. 360/106
[58] Field of Search .......................................... 360/106

[56] References Cited

U.S. PATENT DOCUMENTS 4,510,543 4/1985 Ohta et al. ......................... 360/106

Primary Examiner—Robert S. Tupper
Attorney, Agent, or Firm—Wegner, Cantor, Mueller & Player

[57] ABSTRACT

A magnetic head of a tape recorder is turned over 180° upon each change-over of the running direction of a magnetic tape so as to effect the change-over from one playback track to another or from one recording track to another. A tapered surface is formed on at least one of a turning member with the magnetic head mounted thereon and a bearing member with the turning member supported turnably thereon. An urging means such as spring or solenoid is provided to urge the turning member in the axial direction thereof, whereby the tapered surface is maintained in contact with the associated member.

11 Claims, 5 Drawing Sheets

AUTOMATIC REVERSE TAPE RECORDER WITH HEAD TURN-OVER

This application is a continuation of U.S. Ser. No. 020,906, filed Mar. 2, 1987 now abandoned.

BACKGROUND OF THE INVENTION (1) Field of the Invention

This invention relates to a tape recorder, especially to a tape recorder the magnetic head of which is turned over 180° upon each change-over of the running direction of a magnetic tape.

(2) Description of the Prior Art

In some of conventional tape recorders equipped with an auto-reverse function, the magnetic head is turned over 180° upon each change-over of the running direction of a magnetic tape. Turning-over mechanisms of this sort are constructed generally as shown in FIG. 6. Namely, a turning shaft 64 is fixed on a head mount 62, which carries a magnetic head 61 thereon, with the central axis of turning of the turning shaft 64 being coincided with the central axis of turn-over of the head 61. The turning shaft 64 is also supported turnably on a bearing 65. By turning a disk-shaped flange 66 secured fixedly on the lower extremity of the turning shaft 64, the head 61 is caused to turn about the central axis of its turning so that the head 61 is held at a predetermined position (the position turned over 180°) by a stopper 63.

Mechanisms of the above-described sort are however accompanied by the following drawbacks. Due to the existence of a clearance between the turning shaft 64 and the bearing 65, the magnetic head 61 is off-centered (i.e., deviated from the center) or tilted. When such off-centering or inclination takes place, the optimum positional relation between the head 61 and an associated magnetic tape is affected adversely so that the acoustic characteristics are lowered significantly. It has hence been necessary to provide a tape guide 67 on a side wall of the head 61 in order to maintain the precise positional relation between the head 61 and the tape.

Where the tape guide 67 is fixed on the side wall of the head 61, it is necessary to cause the head 61 to retreat once whenever it is desired to turn the head 61 over 180° upon each change-over of the running direction of the tape. It is hence necessary, as shown in FIG. 7(a), to shift the head 61 back and forth, to say nothing of turning of the head 61. This has led to the need for a complex mechanism to shift the head 61. If the maximum turning radius of the head 61 is greater than one half of the height of a window 68 of a tape cassette, it is impossible to turn the head 61 within the cassette as depicted in FIG. 7(b). In this case, it is indispensable to cause the head 61 to retreat from the interior of the cassette. This requirement has resulted in problems such that the reverse operation of the tape running direction takes lots of time.

SUMMARY OF THE INVENTION

With the foregoing in view, the present invention has as a principal object the provision of a tape recorder in which the magnetic head is allowed to turn over 180° without need for its retreat and as a consequence, the shifting mechanism for the magnetic head can be simplified and the time required for the reversal of the running direction of the tape can be shortened.

It is the principal concept of this invention to avoid the need for a tape guide at a position close to a head by eliminating the possibility of inclination and off-centering of the head.

In one aspect of this invention, there is thus provided a tape recorder in which a magnetic head is turned over 180° upon each change-over of the running direction of a magnetic tape so as to effect the change-over from one playback track to another or from one recording track to another. A tapered surface is formed on at least one of a turning member with the magnetic head mounted thereon and a bearing member with the turning member supported turnably thereon. An urging means is provided to urge the turning member in the axial direction thereof so as to maintain the tapered surface in contact with the associated member.

Owing to the above construction, the turning member and bearing member are maintained in mutual contact at the tapered surface so that the turning member is held surely at a predetermined position. The magnetic head is thus substantially free from inclination or off-centering, whereby it is no longer necessary to provide a tape guide in the proximity of the head. It is therefore possible to turn the magnetic head, which is in the recording or playback mode, over 180° while maintaining the contact of the magnetic head with a magnetic tape, in other words, without need for causing the magnetic head to retreat. It is hence possible to simplify the turning mechanism for the magnetic head and also to shorten the time required for the reversal of the running direction of the tape. Accordingly, the present invention is extremely useful.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
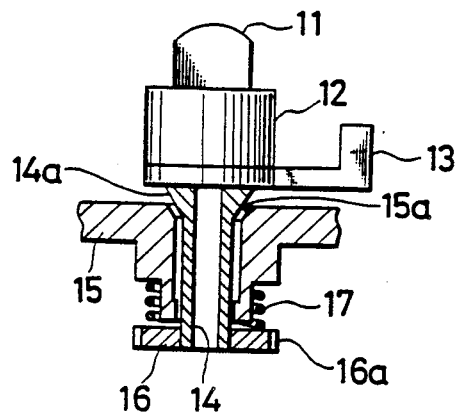
FIG. 1 is a partly-fragmentary cross-sectional view of a magnetic head and its related members in a tape recorder according to one embodiment of this invention.

Referring to FIG. 1, numeral 11 indicates a magnetic head which is mounted on a head mount 12. A turning shaft (turning member) 14 is fixed along with a stopper 13 on the head mount 12. The stopper 13 serves as a member for controlling the position of the head 11 when the head has been turned over 180°. The turning shaft 14 is fixed on the head mount 12 with the central axis of turning of the turning shaft 14 being coincided with the central axis of turn-over of the head 11. The turning shaft 14 is supported turnably by a bearing (bearing member) 15. The outer periphery of the turning shaft 14 is formed at an area near the upper end thereof into a tapered surface 14a. The tapered surface 14a flares out toward the upper end of the turning shaft 14. Furthermore, the inner periphery of the bearing 15 is also formed at an area near the upper end thereof into a tapered surface 15a. The tapered surface 15a is formed in opposition to the tapered surface 14a and flares out toward the upper end of the bearing 15.

A disk-shaped flange 16 with teeth 16a formed on the outer periphery thereof is secured fixedly on the lower end of the turning shaft 14. A turning drive force is transmitted to the flange 16 so as to turn the head 11. A spring (push spring) 17 is arranged between the bearing 15 and the flange 16. The spring 17 serves to urge the turning shaft 14 in the downward direction as viewed in FIG. 1.

Figure 2A:
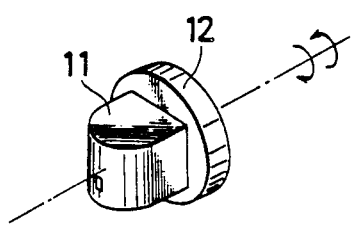
FIGS. 2(a) through 2(c) are schematic illustrations showing the manner of turning of a magnetic head, the dimensional relation between the magnetic head and its associated cassette window, and the maximum turning radius of the magnetic head respectively.
Figure 2B:
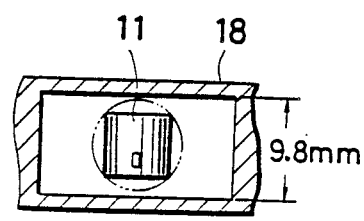
Figure 2C:
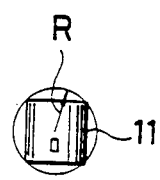
Figure 3:
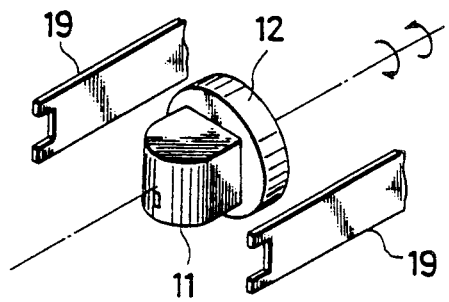
FIG. 3 is a perspective view showing the manner of arrangement of tape guides by way of example.

Upon transmission of the turning force to the flange 16, the magnetic head 11 is turned over 180° as depicted in FIG. 2(a). In the playback or recording mode, the head 11 is inserted in a window 18 of a tape cassette as shown in FIG. 2(b) so that the head is maintained in contact with the magnetic tape (not shown). Here, the head 11 has such dimensions that the maximum turning radius R of the head 11 is smaller than one half of the height (9.8 mm) of the window 18 [see, FIG. 2(b) and 2(c)]. Unlike conventional structures, no tape guide is fixed on the head 11. Instead, tape guides 19,19 are provided at locations apart from the head 11.

Figure 4A:
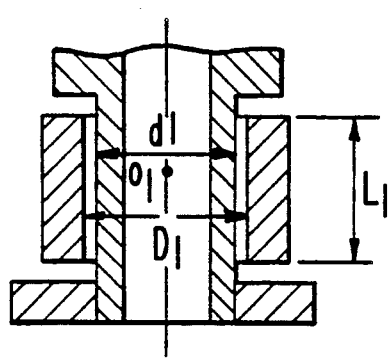
FIGS. 4(a) and 4(b) schematically illustrate effects of the exemplified structure in comparison with a conventional structure.
Figure 4B:
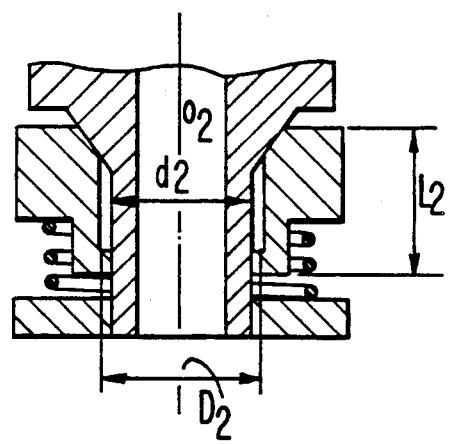

Since the turning shaft 14 is urged downwardly by the spring 17 in the above-described structure, the tapered surface 14a of the turning shaft 14 and the tapered surface 15a of the bearing 15 are pressed against each other. The off-centering and inclination of the head 11 are therefore reduced to extremely small degrees. A conventional structure and the structure of the first embodiment of this invention are now compared with reference to FIGS. 4(a) and 4(b). Let's now assume that as shown in FIGS. 4(a) and 4(b), the outer diameters of the turning shafts are $d_1, d_2$, the inner diameters of the bearings $D_1, D_2$, and the axial lengths of the bearings $L_1, L_2$ (note: $d_1 = d_2$, $D_1 = D_2$, and $L_1 = L_2$). The degree $\Delta x_1$ of off-centering in the conventional structure is expressed by the following equation.

$$\Delta x_1 = \frac{D_1 - d_1}{2}$$

On the other hand, the degree $\Delta x_2$ of off-centering in the structure of this embodiment is zero ($\Delta x_2 = 0$) because the tapered surfaces 14a and 15a are maintained in tight contact with each other by the spring force.

Regarding the inclination on the other hand, the inclination $\alpha_1$ of the turning shaft in the conventional structure is expressed by the following equation;

$$\alpha_1 \simeq \sin^{-1} \frac{D_1 - d_1}{L_1}$$

In the structure of the embodiment, the inclination $\alpha_2$ of the turning shaft is expressed by the following equation;

$$\alpha_2 \simeq \sin^{-1} \frac{D_2/2 - d_2/2}{L_2}$$

Therefore, the inclination $\alpha_2$ in the structure of the illustrated embodiment is one half of the inclination $\alpha_1$ in the conventional structure. In addition, the center of the inclination is located at a point closer to the head in the structure of the illustrated embodiment. The influence of the inclination to the deviation in height of the head is extremely little in the structure of the illustrated embodiment.

Even at the same inclination, the deviation in height is smaller in the case of the illustrated embodiment. Since $\alpha_2 = \alpha/2$, the deviation in height of the head in the structure of the illustrated embodiment should be extremely small.

In the illustrated embodiment, the tapered surfaces 14a,15a are provided respectively with the turning shaft 14 and bearing 15 and the tapered surfaces 14a,15a are maintained in tight contact by the urging force of the spring 17. It is hence possible to make the off-centering and inclination of the magnetic head 11 extremely small. Since the off-centering and inclination of the magnetic head 11 have been eliminated substantially, it is no longer required to provide a tape guide on a side wall of the head 11. Namely, the tape guides 19,19 are provided at the locations apart from the head 11. It is hence possible to cause the magnetic head 11 to turn while maintaining same in contact with the associated magnetic tape. By choosing the dimensions of the head 11 as shown in FIG. 2(b), it is also possible to allow the head 11 to turn while maintaining the head 11 in a position inserted in the window 18.

According to this embodiment, it is therefore possible to cause the magnetic head 11 to turn over 180° while maintaining the head 11 in contact with the magnetic tape in both recording and playback modes. It is hence possible to obviate any mechanism which is otherwise required to cause the magnetic head to retreat and advance upon each reversal of the running direction of magnetic tape, leading to significant simplification to the turn-over and drive mechanism of the head 11 and hence a reduction to the manufacturing cost. Since it is no longer required to cause the head 11 to retreat and then to advance, another advantage has also been brought about that the time required for the reversal of the heat 11 can be shortened.

Figure 5A:
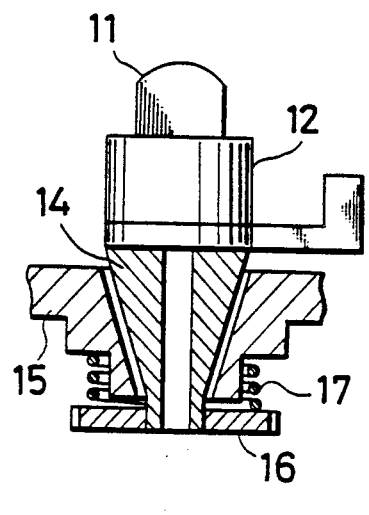
FIG. 5(a) through 5(d) are respectively partly-fragmentary cross-sectional views of magnetic heads and their related members in tape recorders according to other embodiments of this invention.
Figure 5B:
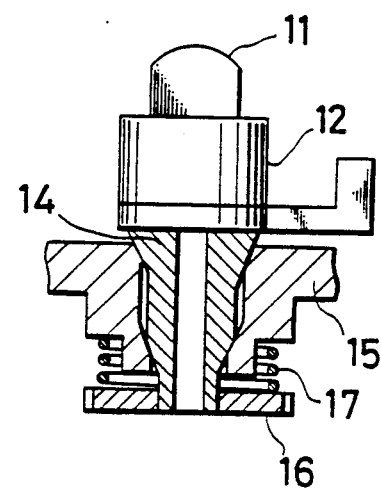
Figure 5C:
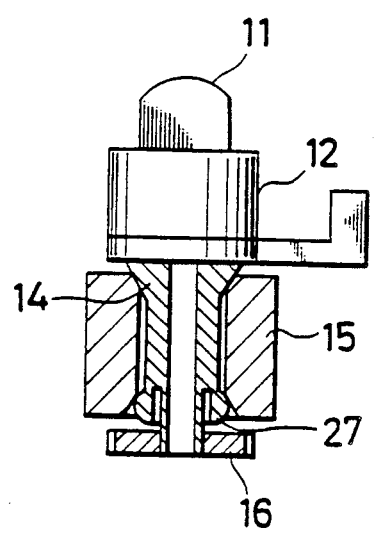
Figure 5D:
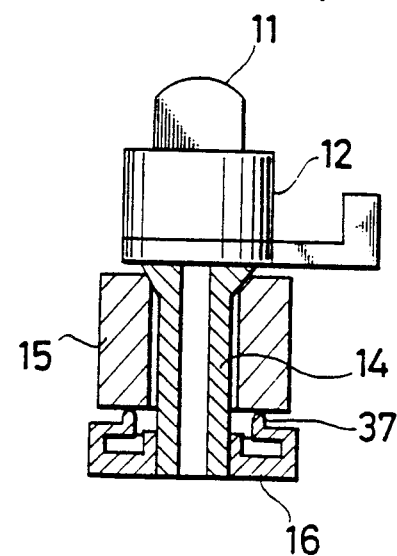
Figure 6:
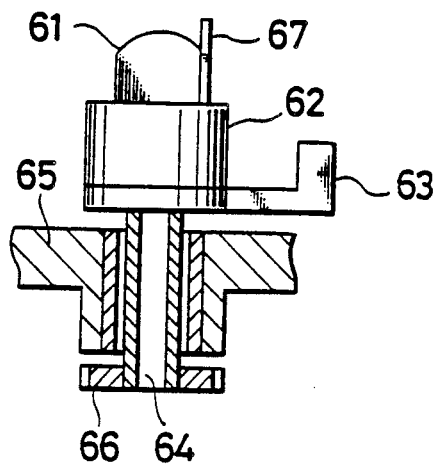
FIG. 6 is a partly-fragmentary cross-sectional view of a magnetic head and its related members in a conventional tape recorder.
Figure 7A:
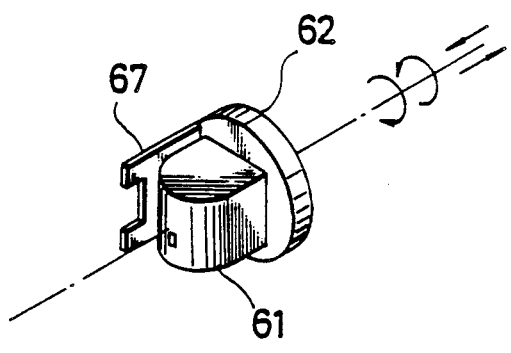
FIGS. 7(a) and 7(b) schematically illustrate problems of the conventional structure of FIG. 6.
Figure 7B:
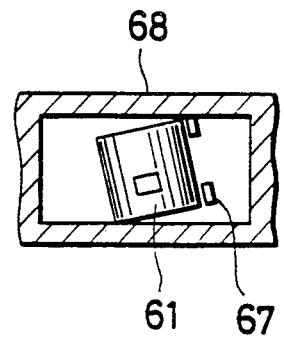

FIGS. 5(a) through 5(d) are respectively partly-fragmentary cross-sectional views of magnetic heads and their related members in tape recorders according to other embodiments of this invention. In FIG. 5(a), the tapered surfaces are enlarged, namely, the axial dimensions of the tapered surfaces are long. In FIG. 5(b), tapered surfaces are formed at two locations, namely, at upper and lower end portions by way of example. In FIG. 5(c), two tapered surfaces are formed at both upper and lower end portions of the bearing 15 and an elastic skirt 27 is formed integrally with the turning shaft 14. The elastic skirt 27 is maintained in contact with the lower tapered surface of the bearing 15. In FIG. 5(d), a short elastic cylinder 37 which is formed as an integral member with the disk-shaped flange 16 is in abutment with the lower end surface of the bearing 15. Needless to say, all of these modified structures can bring about the same advantageous effects as the above-described first embodiment of this invention.

Figure 10A:
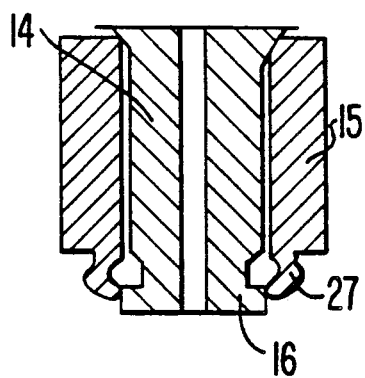
FIG. 10A and 10B are partly fragmentary cross-sectional views according to other embodiments of this invention.
Figure 10B:
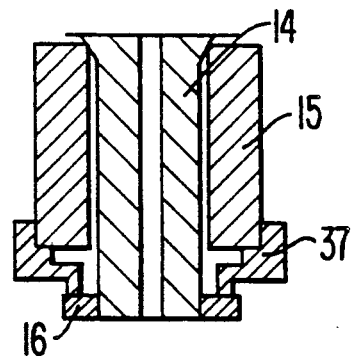
Figure 8:
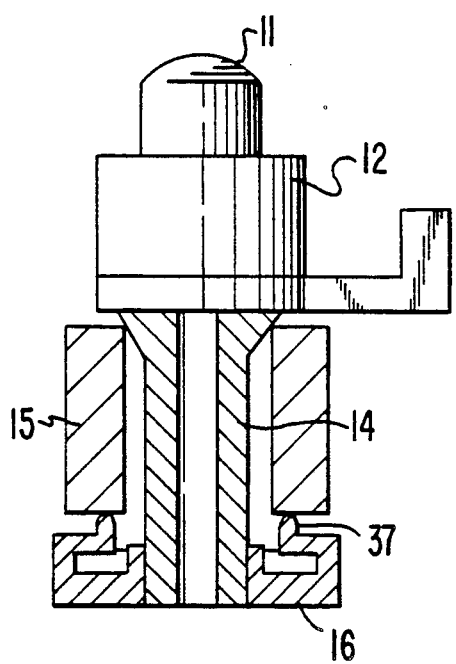
FIG. 8 is a partly fragmentary cross-sectional view of another embodiment of the present invention.
Figure 9:
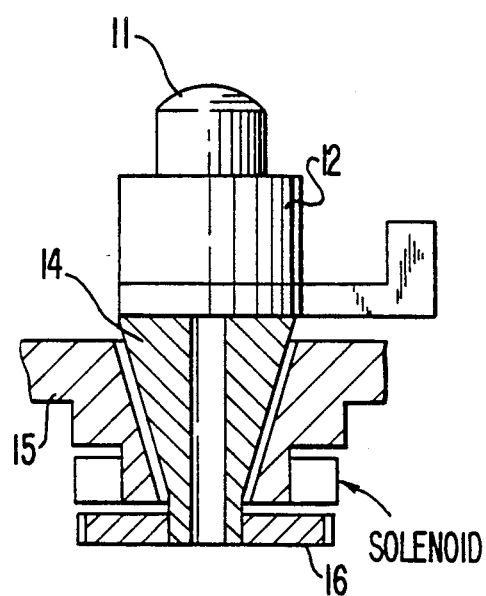
FIG. 9 is a partly fragmentary cross-sectional view of still another embodiment of the present invention.

It should be borne in mind that the present invention is not necessarily limited to or by the above-described embodiments. For example, it is not essential to provide tapered surfaces on both turning member and bearing member. It is still acceptable to form a tapered surface on either one of the turning member and bearing member a shown in FIG. 8. It is also feasible to use a solenoid as a means for urging the turning member as shown in FIG. 9. It is also feasible to form elastic skirt 27 or short elastic cylinder 37 integrally with bearing 15 instead of turning shaft 14, as shown in FIGS. 10A and 10B.

Having now fully described the invention, it will be apparent to one of ordinary skill in the art that many changes and modifications can be made thereto without departing from the spirit or scope of the invention as set forth herein.

I claim:

1. A tape recorder comprising:
   (A) a turning member having a contact portion;
   (B) a magnetic head mounted on said turning member, said magnetic head being rotated 180° upon each change of the running direction of a magnetic tape so as to effect the change-over from one track to another;
   (C) a bearing member having a contact portion;
   (D) said turning member being rotatably supported on said bearing member with at least a part of each of said contact portions being in contact with the other, the contact portion of at least one of said turning member and said bearing member being tapered; and
   (E) means for urging said turning member in the axial direction thereof so as to maintain said turning member in direct contact with said bearing member at said contact portions.

2. The tape recorder as claimed in claim 1, wherein said urging means is a spring.

3. The tape recorder as claimed in claim 1, wherein said urging means is a solenoid.

4. The tape recorder as claimed in claim 1, wherein said urging means is an elastic portion provided on said bearing member and said elastic portion is maintained in contact with said turning member by the elasticity thereof.

5. The tape recorder as claimed in claim 1, wherein said urging means is an elastic portion provided on said turning member and said elastic portion is maintained in contact with said bearing member by the elasticity thereof.

6. The tape recorder as claimed in claim 1, wherein said turning member and said bearing member both have tapered surfaces.

7. A tape recorder comprising:
   (A) a turning member comprising an axial turning shaft with an enlarged portion at one end thereof forming a contact portion;
   (B) a magnetic head mounted on said enlarged portion of said turning member, said magnetic head being rotated 180° upon each change of the running direction of a magnetic tape so as to effect the change-over from one track to another;
   (C) a bearing member having an axial bore, said axial bore having a contact portion;
   (D) said turning member being rotatably supported on said bearing member with said contact portion of said enlarged portion resting on said contact portion of said bore and said axial turning shaft extending through said bore, at least one of said contact portions being tapered; and
   (E) means for urging said turning member in the axial direction thereof so as to maintain said turning member in direct contact with said bearing member at said contact portions.

8. The tape recorder as claimed in claim 7, wherein said contact portions both have tapered surfaces.

9. The tape recorder as claimed in claim 8, wherein said tapered contact portion on said bore is at one end thereof.

10. The tape recorder as claimed in claim 8, wherein said tapered contact surface of said bore extends the full axial length of said bore.

11. The tape recorder as claimed in claim 8, wherein said bore comprises a first tapered contact portion at one end thereof and a second tapered contact portion at the other end thereof, and said turning member has a first tapered contact portion at the enlarged portion thereof and a second tapered contact portion at a location distal from said enlarged portion, said first and second contact portions of said turning member mating with said first and second contact portions of said bore, respectively

* * * * *